Oct. 11, 1932.  R. A. REED ET AL  1,882,338
AIRPLANE
Filed Jan. 8, 1931  2 Sheets-Sheet 1
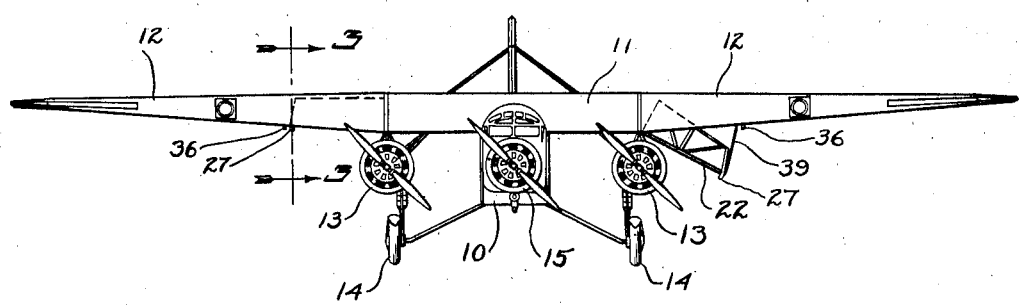
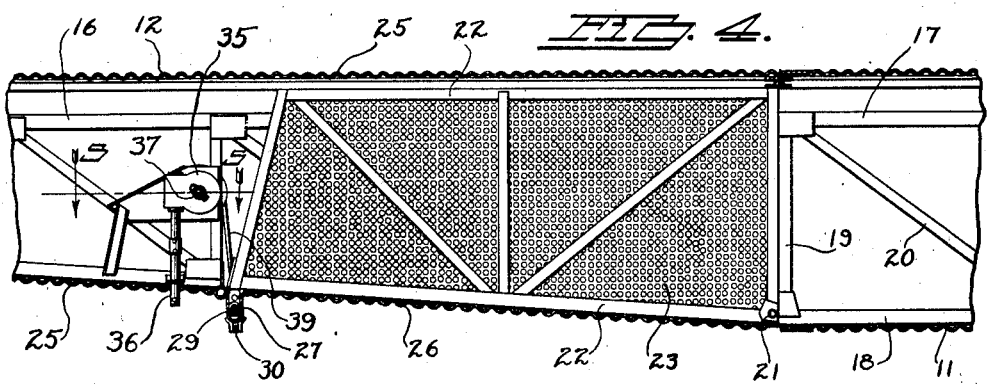
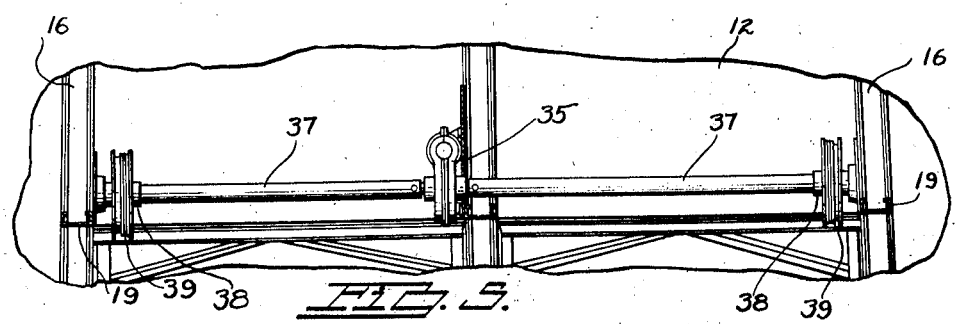
INVENTOR.
R. A. Reed.
H. A. Hicks.
BY
ATTORNEY.

Oct. 11, 1932.    R. A. REED ET AL    1,882,338
AIRPLANE
Filed Jan. 8, 1931    2 Sheets-Sheet 2

INVENTOR.
R. A. Reed.
H. A. Hicks.
BY
ATTORNEY.

Patented Oct. 11, 1932

1,882,338

UNITED STATES PATENT OFFICE

RALPH A. REED, OF DEARBORN, AND HAROLD A. HICKS, OF DETROIT, MICHIGAN, ASSIGNORS TO FORD MOTOR COMPANY, OF DEARBORN, MICHIGAN, A CORPORATION OF DELAWARE

AIRPLANE

Application filed January 8, 1931. Serial No. 507,314.

The object of our invention is to provide an airplane having a novel compartment therein, the purpose of which is to carry mail, baggage or general freight loads. This compartment is removably mounted in the underside of the airplane wing with the bottom of the compartment forming a portion of the lifting surface of the wing. It is preferable, although not absolutely essential, to provide such a compartment in each wing, one on each side of the fuselage, to thereby better balance the plane. It is further recommended that this device be used with a thick wing monoplane of the larger or transport type whereby the relatively deep space within the wing may accommodate large parcel receiving compartments to thereby provide greater space for carrying the freight than is usually provided.

The ordinary commercial airplane is required at the present time to carry both freight (mail) and passengers if financial success is to be had and consequently, space must be provided in the plane for each of these loads. In order to give the passengers the maximum of comfort the whole rear portion of the fuselage is set off for this purpose while the freight is carried in a section just to the rear of the pilot's cockpit. This freight portion is invariably located in the forward part of the fuselage on account of the greater height and width thereof at this point. The streamline shape of the fuselage, together with the extra height thereof at this forward point, makes it possible to provide greater cubic space for the freight while utilizing less length for the freight compartment. The passenger compartment may thereby occupy a greater portion of the fuselage with this arrangement.

The forward end of the larger type airplanes are usually from four to six feet off the ground when the plane is at rest because of the large clearance required for the landing gear, while the rear end of the fuselage is very close to the ground. The entrance door of such a plane has therefore been located at the rear of the passenger compartment to obviate the use of ladders or the like when the passengers enter the plane. It will therefore be seen that when mail or freight is loaded into the plane it must be carried through the passenger compartment which results in considerable inconvenience to the passengers. The aisleways in airplanes are of necessity quite narrow so that the carrying of mail bags during the loading and unloading through these aisles is in the least annoying.

With our improved device the freight is never brought inside of the fuselage so that the space heretofore required for carrying this freight may be converted into passenger quarters and further, so that the passengers may not be annoyed by the loading and unloading of such freight through the aisleways of the plane.

Still another advantage of our improved device is that the freight load, being carried in the wing section, allows a lighter wing structure to be used than if this load were carried as formerly in the fuselage. In this connection a widely used model of the Ford tri-motored transport plane has a normal capacity or pay load of about 3,000 pounds. When such load is carried in the fuselage it will readily be seen that the wing spars must be proportionately stronger than when a large portion of this load is carried directly in the wing. This is due to the many times increased stress induced in such internally braced wings by the load in the fuselage.

When our device is incorporated in such planes the fuselage load is reduced to about 1,800 pounds, the freight load of 1,200 pounds being carried in the wings. Thus, the wing spars may be materially lightened, perhaps several hundred pounds, while still maintaining the same factor of safety for the ship as a whole. This decrease in weight of the ship not only lessens the cost thereof but allows the pay load to be increased proportionately, thereby adding materially to the revenue from the plane. This one advantage alone may make a paying proposition from a route which would otherwise be a financial loss to the carriers.

Still a further object of our invention is to provide mail compartments in the wings of an airplane, which compartments are accessible only from beneath the wing to thereby insure safety for the mail. After our mail compartment is loaded the post office agent may close and lock the compartment, even to the placing of a government seal thereon, and still the passengers of the plane may have free entrance or exit from the fuselage. In the ordinary airplane where mail is carried in the fuselage, it is very difficult to provide a compartment having sufficient space to carry the proportionate weight of mail and at the same time securely lock this compartment. It is essential that the pilot at the front of the plane be able to walk back through the mail compartment into the passenger compartment, which, of course, he could not do if the compartment were to be locked. The use of lockers along the side of the plane for storing the mail are not practical because of their great weight and relatively small capacity. With the mail safely locked in the wings of the plane and the loading and unloading of the mail being done entirely by post office agents, the pilot is relieved of this added responsibility of accounting for its safety. Further, in so locking these compartments, the pilot in case of a forced landing may leave the plane to summon help without danger of the mail being tampered with.

Still further, due to the large space within the wings of transport planes, a much larger mail compartment may be provided than was formerly possible so that exceptionally bulky matter may be carried.

Still further, quicker loading and unloading of the freight is accomplished when this device is used because of its accessibleness. The mail compartment is arranged to lower to a convenient height above the ground so that the driver of the mail truck may pull up adjacent to the compartment to load or unload the mail therefrom. The mail is then tossed directly from the truck into the mail compartment without other handling and the compartment then closed and sealed, thus requiring a minimum amount of loading time.

With these and other objects in view our invention consists in the arrangement, construction and combination of the various parts of our improved device, as described in the specification, claimed in our claims and illustrated in the accompanying drawings, in which:

Figure 1 shows a front view of a transport airplane having our improved mail compartments installed therein.

Figure 4 shows a sectional view taken on the line 4—4 of Figure 3, and

Figure 5 shows a sectional view taken on the line 5—5 of Figure 4.

Figure 2:
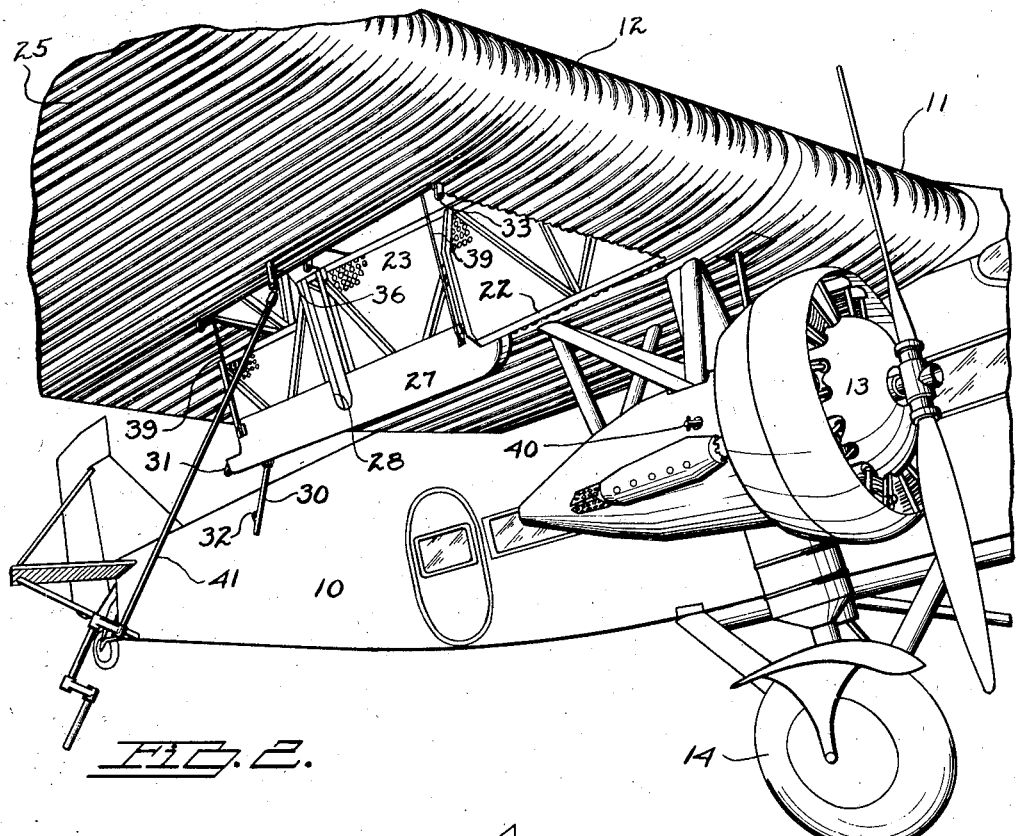
Figure 2 shows a perspective view of the airplane shown in Figure 1, one mail compartment being shown opened to better illustrate the construction.

Referring to the accompanying drawings, we have used the reference numeral 10 to indicate generally an airplane fuselage, preferably of the cabin type high wing monoplane structure. A center wing section 11 is secured to the upper forward portion of the fuselage 10 and extends outwardly from each side thereof to form oppositely extending stub wings. To each end of this center portion 11 a wing 12 is detachably secured to form a single wing extending across the top of the fuselage. A pair of outboard motors 13 are suspended beneath the outer ends of the section 11 and landing wheels 14 are mounted beneath these motors to thereby directly support the load of these engines and the plane. Also a center motor 15 is provided in the forward end of the fuselage.

It will be noted that the landing wheels support the weight of the fuselage through the wing member 11 when the plane is on the ground. This wing portion is subject to a large bending moment when landing the plane, due to the great weight of the fuselage and consequently the wing spars which give strength to this wing portion must be exceptionally strong. Thus the advantage of our structure, wherein a large portion of the normal load in the fuselage is carried directly in the wing above the landing wheels, is apparent.

When the plane is in the air, the center section 11 is still subject to this bending load, as the lift of the wing must necessarily balance the weight of the plane and load carried. In order to resist this bending load, we have provided three laterally spaced wing spars 16 which extend the length of each wing portion 12 and which are detachably connected to similar spars extending through the center portion 11. These spars are of the built-up type having upper and lower longitudinal members 17 and 18, respectively, vertical struts 19 and diagonal braces 20. Because no external bracing is used in this type of plane the wing is exceptionally thick thereby reducing the stress on the various members of the spars and providing ample space to house our compartments in the wings.

The entire airplane is covered with a corrugated metal covering 25. In the under side of each wing 12, adjacent to the connection with the center section 11, we have provided a rectangular shaped opening in this covering, which opening extends laterally between the front and rear spar members and lengthwise about one quarter the length of the wing 12. Our mail compartments are adapted to swing up into the wing through these openings.

Two rectangular shaped box-like members are adapted to fit in the spaces between the forward and center spar members and between the center and rear spars. These compartments are each built around a frame member 22 to which is secured perforated metal wall plates 23 and end plates 24. A suitable floor is also provided in each compartment and each are hinged to the spars 16, adjacent to the fastening point of the wings 12, on suitable trunnions 21.

The purpose of providing two compartments for each wing is to utilize the major portion or width of the wing without weakening the center spar. Ample carrying space is thereby provided. As the two compartments in each wing are arranged to operate together we are enabled to provide a corrugated metal covering 26 over the bottom of these two compartments, the covering extending continuously from the forward edge of the forward compartment to the rear edge of the rear compartment.

In order that both of the compartments in each wing may be simultaneously raised or lowered we have provided a beam 27 which extends transversely underneath the free ends of both compartments. The center portion of this beam is slotted at 28 to allow clearance for the center wing spar. This beam 27 has the dual function of tying together the free ends of the compartments and also of housing the latching device which locks the compartments closed.

Figure 3:
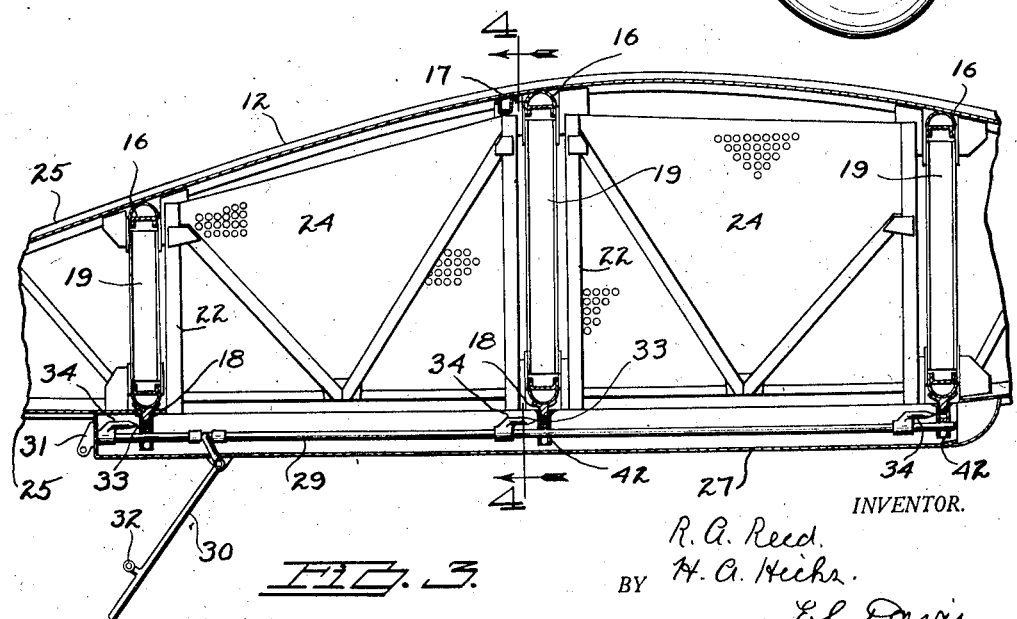
Figure 3 shows a sectional view taken on the line 3—3 of Figure 1.

Referring to Figure 3, it will be seen that the beam members 27 consist of annular channels each of which enclose a rod 29 reciprocally mounted therein and which extends longitudinally therethrough. A bell crank lever 30 is pivotally secured to each beam 27 in position so that when it is pushed up flat against the lower edge of the beam the rod 29 is reciprocated forwardly. An ear 31 is secured to the rear end of the beam in position to coact with an eye 32 formed on the lever 30 so that a padlock or seal may conveniently lock the members together. An eye 33 extends downwardly from each spar 16 adjacent to the rod 29 which, when the device is closed, is aligned with a pair of openings in each of a plurality of rod supporting bearings 42. A plurality of pins 34 are fastened on the rod 29 adjacent to each of these bearings 42 which are adapted to extend through the openings in the bearings and eyes 33 when the lever 30 is shifted into its locked position. Thus, the beams 27 and consequently the free ends of the compartments are securely fastened to the wing spars when the devices are in their locked positions.

Referring to Figure 5, we have shown the mechanism whereby the free ends of the compartments may be raised or lowered. A conventional worm and worm wheel speed reducing mechanism 35 is fastened to the center spar member about midway between its upper and lower edges and a worm extension shaft 36 projects down through the lower surface of the wing to be thereby accessible for operation from beneath the wing. A pair of shafts 37 extend forwardly and rearwardly, respectively, from the speed reducer 35 to the front and rear wing spar where the free ends of these shafts are rotatably mounted. Suitable sheaves 38 are secured to the outer ends of these shafts and a pair of cables 39, each having one end secured to the respective sheave and the other end fastened to the adjacent end of the beam member 27. Thus, when the shaft 36 is rotated the shafts 37 and sheaves 38 are also rotated at a much reduced speed to thereby wind up or let out the cables attached to the sheaves and consequently raise or lower the free end of the device.

In order that the shaft 36 may be conveniently rotated we have provided its lower end with a connection identical to the connection used on the engine inertia starting shaft 40 which extends from the side of each engine nacelle. Thus, the same crank 41 which is used to energize the engine inertia starter may also be used for raising and lowering our mail compartments.

In some installations it may be desirable to raise or lower both ends of the compartment simultaneously, as the operation of an elevator, and it is our desire to include such structure within the scope of this invention.

To operate our improved device the mail truck drives up along side of the airplane and the operator releases the lever 30 and then taking the starting crank 41 lowers the compartment until its contents of mail bags are readily accessible. After adding to or removing the desired mail, he then winds up the crank which draws the compartment shut and then locking the lever 30 the plane is ready for flight. No carrying or handling of the mail in the airplane fuselage is required and consequently, the passengers are not molested by this transfer.

Among the many other advantages arising from the use of our improved device it may be well to mention that by distributing the freight load to a point adjacent to the center of lift of the wing, we are enabled to provide wing spars materially lighter than formerly were required or we may increase the pay load of the plane. Still further, by dispensing with the mail compartment within the fuselage more spacious passenger accommodations are provided to improve the service rendered. Still further, our improved mail compartment being isolated from the fuselage may be closed and locked by government employees so that tampering with the mail is impossible even though a forced landing was made and the pilot left the ship to summon aid. Further, more spacious freight carrying space may readily be provided to thereby better accommodate bulky material.

Some changes may be made in the arrangement, construction and combination of the various parts of our improved device without departing from the spirit of our invention and it is our intention to cover by our claims such changes as may reasonably be included within the scope thereof.

We claim as our invention:

1. An airplane wing having an opening in the covering forming the undersurface thereof, a door hinged to the wing at one edge of said opening to form a removable closure therefor, and an article-carrying container secured to the inside of said door, the vertical walls of said container being of such height that the container substantially fills the space between the upper and lower surfaces of the wing.

2. An airplane wing having an opening in the covering forming the undersurface thereof, a door hinged to the wing at one edge of said opening to form a removable closure therefor and an article-carrying container secured to the inside of said door the vertical walls of the container at the hinged edge and the two adjacent edges being of such height that they extend substantially to the upper surface of the wing when said door is closed, and the wall of the container adjacent to the free edge of the door being of lesser height, whereby articles may be conveniently thrown into the container from the exterior of the wing when said door is opened a relatively small amount.

3. In an airplane, a wing formed around a wing spar with a portion of the covering of the undersurface of said wing beneath said spar being removable, and article-carrying containers on each side of said spar secured to said removable portion of the covering, substantially filling the space between the removable portion and the upper surface of the wing.

4. In an airplane, a wing formed around a wing spar with a portion of the covering of the undersurface of said wing beneath said spar being removable, and a pair of article-carrying containers disposed one on each side of said spar secured to said removable portion, the vertical walls of said containers extending substantially the depth of said spar to thereby substantially fill the space between the upper and lower surfaces of said wing.

5. In an airplane, a wing formed around a wing spar with a portion of the covering of the undersurface of said wing beneath said spar being hinged along one edge, article-carrying containers disposed one on each side of said spar secured to said hinged portion, and a beam lying beneath the undersurface of the wing connecting the free edges of said containers for the purpose described.

6. In an airplane, a wing formed around a plurality of wing spars, having an opening in the undersurface thereof, a door-like member hinged to said wing and adapted to form a closure for said opening, article-carrying containers disposed on each side of one of said spars and secured to the inside of said door so as to swing up into position between the wing spars, and a beam lying beneath the undersurface of the wing connecting the free edges of said containers for the purpose described.

7. A device, as claimed in claim 6, having the article-carrying containers of such height that they substantially fill the space between the upper and lower surfaces of said wing.

8. An airplane wing formed around a plurality of longitudinally extending and laterally spaced wing spars, said wing having an opening in the covering forming the undersurface thereof with one of said spars substantially bisecting said opening, a door hinged to the wing at one edge of said opening to form a removable closure therefor, the swinging path of said door being parallel to said wing spars, an article-carrying container secured to the inside of said door on each side of said bisecting spar, the vertical walls of the containers at all but the free edges thereof extending substantially the full thickness of the wing when said door is closed and the wall at the free edge of each container being of lesser height whereby articles may be conveniently thrown into the containers from the exterior of the wing when said door is opened a relatively small amount, and a beam lying beneath the undersurface of the wing connecting said free edges for the purpose described.

RALPH A. REED.
HAROLD A. HICKS.